United States Patent [19]

Naruse et al.

[11] Patent Number: 4,973,828
[45] Date of Patent: Nov. 27, 1990

[54] PORTABLE ELECTRONIC MEDIUM

[75] Inventors: Kazuaki Naruse; Hideo Matsuoka, both of Kanagawa, Japan

[73] Assignee: Kabushiki Kaisha Toshiba, Kawasaki, Japan

[21] Appl. No.: 327,122

[22] Filed: Mar. 22, 1989

[30] Foreign Application Priority Data

Apr. 15, 1988 [JP] Japan .................................. 63-93120

[51] Int. Cl.⁵ ............................................. G06K 5/00
[52] U.S. Cl. ..................................... 235/380; 235/492
[58] Field of Search .............................. 235/380, 492

[56] References Cited

U.S. PATENT DOCUMENTS 4,752,677 6/1988 Nakano .............................. 235/380
4,766,294 8/1988 Nara et al. .

FOREIGN PATENT DOCUMENTS 0167044 1/1986 European Pat. Off. .

*Primary Examiner*—Harold I. Pitts
*Attorney, Agent, or Firm*—Cushman, Darby & Cushman

[57] ABSTRACT

A portable electronic medium such as an IC card, for example. The IC card incorporates a data memory and CPU and is externally provided with a keyboard and a liquid crystal display. The data memory stores a variety of data which respectively indicates the maximum amount allowed for executing transactions in an effective term, the effective term for transactions, the maximum amount for transactions that can be renewed each effective term, and the effective term between renewals. In addition, the IC card also incorporates a clock circuit which generates data indicating present date. When the card holder enters into a transaction using the IC card, the CPU compares data related to the date with the effective term for transactions. If the CPU identifies from the result of comparison that the present date is out of the effective term for transactions, CPU then automatically renews the effective term for transactions and updates maximum amount allowed for transactions by applying data indicating the effective term applicable to renewal and maximum amount for transactions to be renewed.

11 Claims, 3 Drawing Sheets

PORTABLE ELECTRONIC MEDIUM

BACKGROUND OF THE INVENTION

The present invention relates to a portable electronic apparatus such as an integrated circuit (IC) card which may be used as a credit card in conjunction with a shopping system, for example.

Recently, an IC card incorporating an IC chip containing an erasable non-volatile memory and a central processing unit (CPU) controlling this memory has been developed as a new portable data memory medium. The IC card allows a variety of data to be input and output in conjunction with external sources by means of the internal CPU which accesses the memory.

Conventionally, the IC card is used in a shopping system in a similar manner as a credit card. The limit of the total amount of charges that may be applied to the card in a month (credit limit) is stored in the IC card. When making a purchase, an operator inserts the IC card into terminal equipment and inputs the charge amount by operating a keyboard of the terminal equipment. The terminal equipment generates a new credit limit by subtracting the input amount of the transaction from the credit limit stored in the memory of the IC card and stores the new credit limit in the memory.

The credit limit stored in the memory of the IC card is renewed every predetermined term, for example the first day of each month. Conventionally, the credit limit is renewed by using the IC card with specific terminal equipment owned by the IC-card issuer. In other words, while using any conventional IC card for purchasing merchandise on credit, only the IC-card issuer can renew the credit limit. As a result, each IC-card holder must seek out an appropriate terminal for renewing his credit limit to continue transactions each term. This is bothersome and inconvenient to all those who hold IC cards.

As an alternative, a study is underway to explore the possibility of renewing the credit limit by means of on-line communication with a host computer. Nevertheless, if this idea is adopted, all IC card holders will be obliged to communicate with the host computer via terminal equipment whenever renewing the credit limit, thus incurring a heavy burden to them in bearing the cost of on-line communication facilities and the communication itself.

In addition, recently, a battery-powered IC card has also been developed, which incorporates a battery and is provided with a keyboard and display and operates without being connected to terminal equipment.

European Patent Publication No. 0167044 (published Aug. 1, 1986) discloses an IC card which is provided with a battery, keyboard and display. In addition, this IC card incorporates a clock and identifies the expiration of the card itself, not only to provide a time after which a new card is required (as is conventional) but also to provide a time after which the battery in the card may fail. Nevertheless, this publication does not disclose means for renewing the credit limit for transactions with the IC card.

SUMMARY OF THE INVENTION

It is an object of the present invention to provide a portable electronic medium which automatically and internally renews the maximum amount allowed for transactions during a transaction period up to a renewal date.

Portable electronic medium according to the present invention comprises first memory means for storing term data which relates to a renewal date of the medium. A second memory means stores maximum amount data indicating a maximum monetary amount allowed for transactions up to the renewal date. A third memory means stores renewable data indicating a monetary amount for setting a new maximum amount data in the second memory means at the renewal date. Calendar means generates data relating to a present date. Comparison means compares the data generated by the calendar means with the term data in the first memory means. Renewal means renews the maximum amount data in the second memory means in accordance with the renewable data in the third memory means when the comparison means indicates that the data generated by the calendar means exceeds the term data in the first memory means.

BRIEF DESCRIPTION OF THE DRAWINGS

An embodiment of this invention will now be described by way of example and with reference to the accompanying drawings, in which.

DETAILED DESCRIPTION OF THE PREFERRED EMBODIMENT

Figure 1:
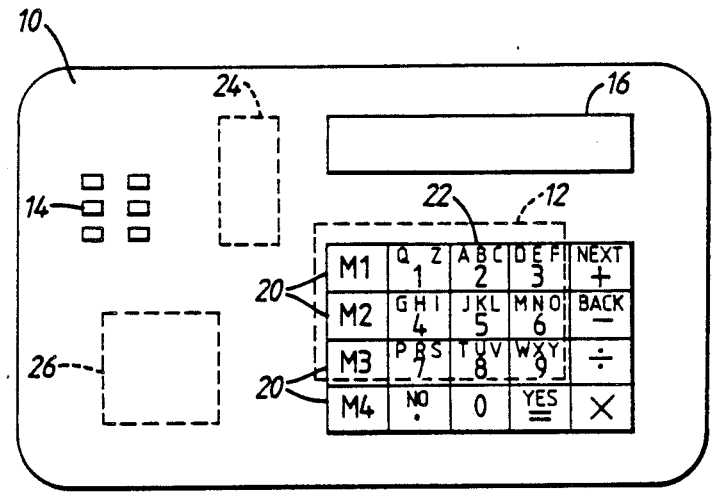
FIG. 1 is a plan view of an IC card as a portable electronic medium according to the present invention.

FIG. 1 shows the front of an IC card which may be used as a credit card and which represents an example of the portable electronic medium related to the present invention. This IC card is commonly usable either for an ON-LINE system (system operation is executed with the IC card being connected to terminal equipment) or an OFF-LINE system (the IC card executes various operations itself). For example, the IC card allows transactions to be executed in conjunction with a plurality of transacting accounts. It includes a clock function which displays data related to date and time, and a calculating function which can execute at least the four basic arithmetic operations. Details of such an IC card is disclosed in U.S. Pat. No. 4,766,294.

Referring now to FIG. 1. Card body 10 is composed of a thinly-molded rectangular plastic card. Contact 14 is placed on a specific position on the surface of card body 10 and is electrically connected to an integrated circuit (IC) 12 built in the card body 10. Contact 14 is placed to electrically communicate with terminal equipment (not shown). In addition, the surface of card body 10 is provided with a liquid crystal display (LCD) 16, which displays input/output data and data related to date and time, and keyboard 18 (input means) used for entry of various data.

The keyboard 18 is composed of a plurality of account keys 20, digit keys 22, and a variety of functional keys. The card body 10 also incorporates crystal oscillator 24 and power supply battery 26.

Figure 2:
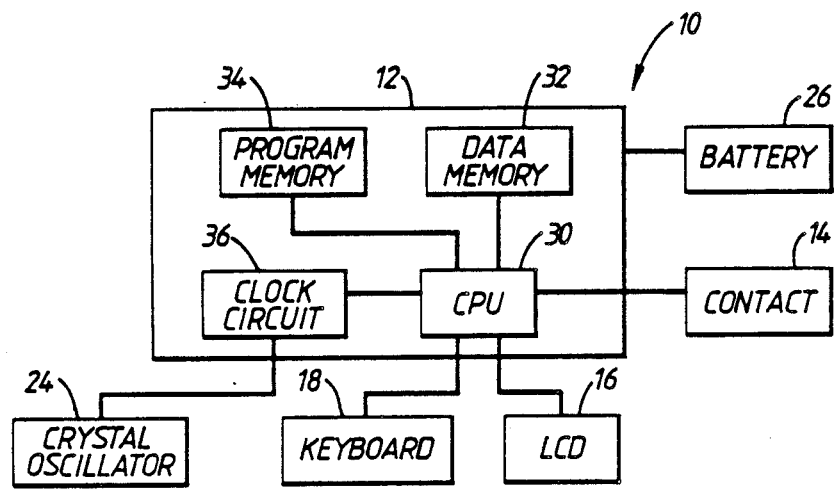
FIG. 2 is a block diagram of the electric circuits off the IC card.
Figures 3, 5:
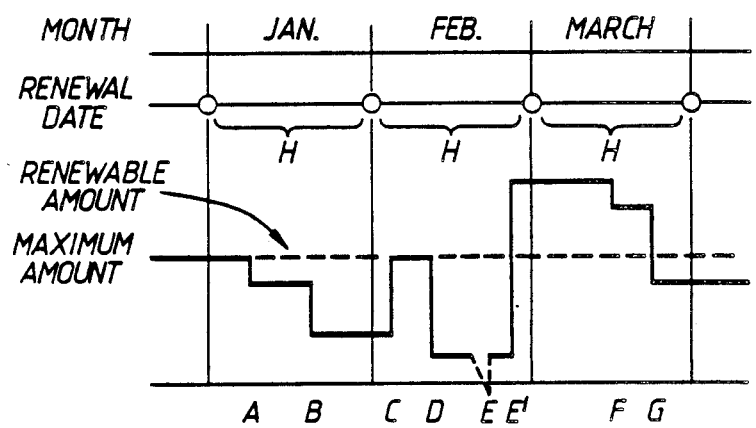
FIG. 3 is a memory configuration of the IC card.
FIG. 5 is a chart indicating internally varying conditions of maximum amount allowed for transactions on credit using the IC card.

FIG. 2 is a simplified block diagram of the circuits within the IC card 10. A central processing unit (CPU) 30, executing overall controlling operations, is connected to the contact 14, the liquid crystal display 16 and the keyboard 18. The CPU 30 is further connected to data memory 32, which stores a variety of data, program memory 34, which stores operation programs of the CPU 30, and clock circuit 36 which generates data related to date and time. CPU 30, data memory 32, program memory 34, and clock circuit 36, are installed in a single IC chip 12 (or in a plurality of IC chips). The integrated circuit 12 receives power from the battery 26. Clock circuit 36 generates data in conjunction with date, month, year, and time, by counting reference clock signals output from the crystal oscillator 24. Data memory 32 is composed of an erasable non-volatile memory such as an EEPROM, for example. As shown in FIG. 3, for example, the data memory 32 is composed of regions 42 (1)–42 (4) each storing the maximum amount allowed for transactions in each effective term, regions 44 (1)–44 (4) each storing the effective term of transactions in which the amounts of transactions are totaled and cannot exceed a maximum, regions 46 (1)–46 (4) each storing the maximum amount to be renewed (renewable data) for each effective term, regions 48 (1)–48 (4) each storing the effective period by which the effective term of transactions can be extended (renewable term data), region 50 which stores an address, name and a personal identification number for the card holder, and region 52 which stores data related to transactions. These data are stored in the data memory 32 for each transacting account (M1) through (M4).

Figure 4:
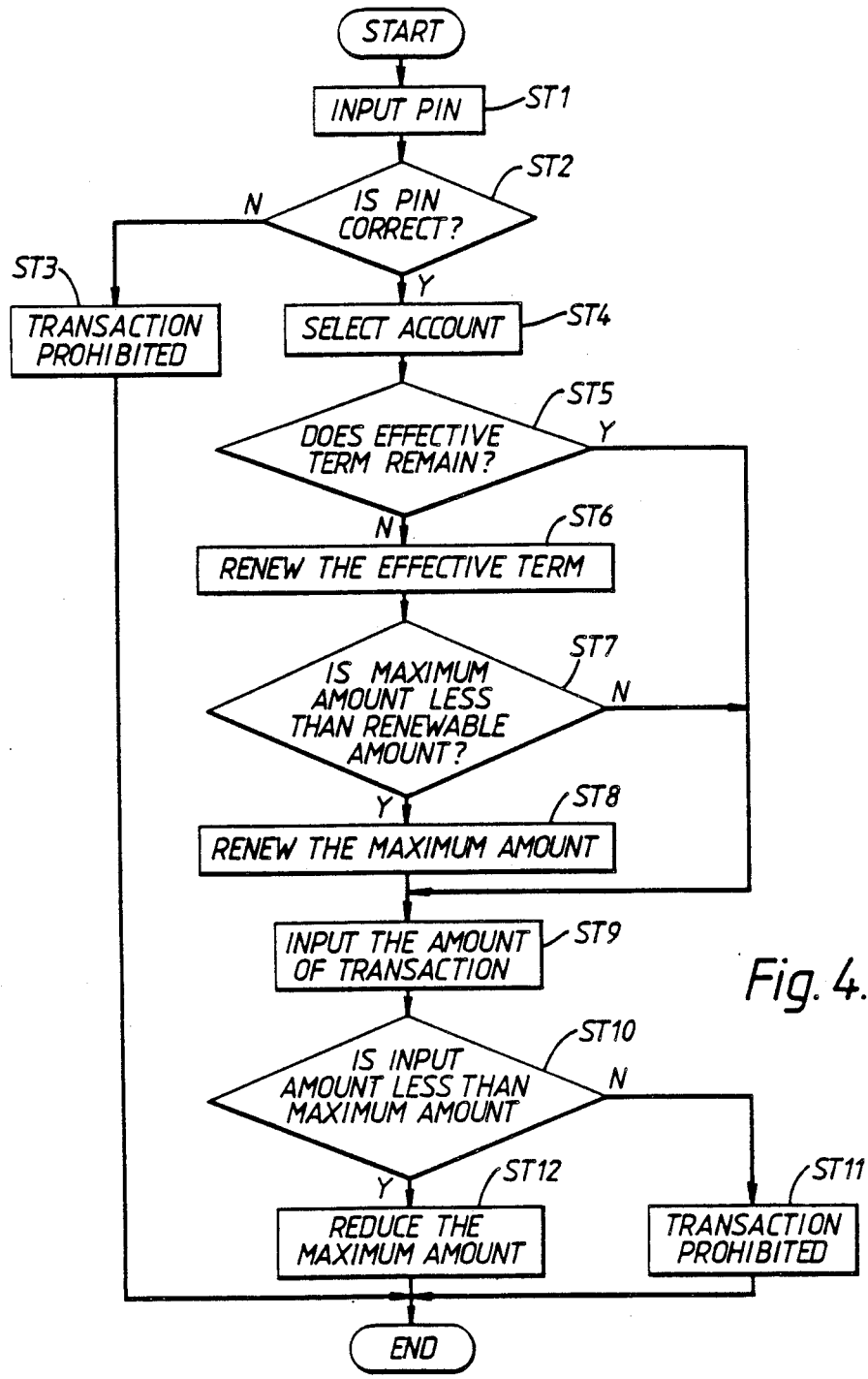
FIG. 4 is a flowchart for executing transaction processes.

Referring now to the flowchart shown in FIG. 4, processes for executing transactions in conjunction with the renewal of the maximum amount and effective term allowed for a transaction are described below. First, a card holder inputs his personal identification number (PIN) by operating the digit keys 22 of keyboard 18 to identify himself (ST 1). CPU 30 then checks to see if the PIN input by the card holder correctly matches the PIN stored in the region 50 of data memory 32 (ST 2). If the PINs do not match, CPU 30 causes liquid crystal display 16 to display a message that a transaction is prohibited (ST 3). This completes the trading process.

Conversely, if the PINs entered by the card holder and stored in the data memory 32 were consistent, then CPU 30 causes liquid crystal display 16 to display a message for guiding the card holder to select any of the transacting accounts M1 through M4 (ST 4), where the card holder selects any of those accounts by operating the account key 20 of keyboard 18. Next, CPU 30 causes comparison means to compare the effective term, in conjunction with the selected account stored in the region 44 (n) of data memory 32, with the present date generated by clock circuit 36. Based on this result, CPU 30 identifies whether any time still remains in the effective term for transactions (ST 5). If the effective term for transactions were identified to have time remaining, no process is executed for renewing the effective term for transactions and the maximum amount allowed for executing transactions during the effective term. Conversely, if CPU 30 identifies that the term allowed for transactions has already run out, CPU 30 executes a process for renewing the effective term for transactions (ST 6). Specifically, CPU 30 generates a new effective term for transactions by adding the renewal term (for example, one month) of the selected account stored in the region 48 (n) to the effective term for transactions stored in the region 44 (n) of data memory 32. The new effective term for transactions is stored in the region 44 (n) of the data memory 32. Next, CPU 30 causes comparison means to compare the maximum amount remaining for transactions during the effective term and related to the selected account stored in the region 42 (n) of data memory with the maximum amount to be renewed for this account stored in region 46 (n) of data memory 32 (ST 7). CPU 30 checks to see if the maximum amount remaining for transactions in the effective term is less than the maximum amount to be renewed, or not. If the maximum amount allowed for transaction equals or exceeds the maximum amount to be renewed, no renewal is executed for the maximum amount allowed for transactions. Conversely, if the maximum amount allowed for transactions is less than the maximum amount to be renewed, CPU 30 converts the maximum amount allowed for transactions to the new maximum amount (ST 8). Specifically, CPU 30 reads the maximum amount to be renewed from the region 46 (n) of data memory 32, and stores the maximum amount to be renewed into the region 42 (n) of data memory.

After completing all the processes needed for renewing the maximum amount allowed for transactions and the effective term for transactions as mentioned above, (or if the transaction term were identified to be still effective and the maximum amount allowed for transactions to be more than that is to be renewed) CPU 30 then causes liquid crystal display 16 to display a message for guiding the card holder to input the amount of a transaction (ST 9). The card holder inputs the amount of the transaction by operating the digit keys 22 of keyboard 18. The CPU 30 identifies whether the input amount for the transaction is less than the maximum amount allowed for transactions stored in region 42 (n) of data memory 32 (ST 10). If CPU 30 identifies that the input amount of the transaction is more than the maximum amount allowed for transactions, the CPU 30 causes liquid crystal display 16 to display a message that the transaction is prohibited (ST 11). This completes the trading process.

If CPU 30 identifies that the input amount of the transaction is less than the maximum amount allowed for a transaction, the CPU 30 generates a new maximum amount allowed for a transaction by subtracting the amount of the transaction from the maximum amount allowed for a transaction in the region 42 (n) of data memory 32. CPU stores the new maximum amount allowed for a transaction in the region 42 (n) of data memory (ST 12). This completes the trading process.

FIG. 5 illustrates the internally varying conditions of the maximum amount allowed for transactions on credit using the IC card. This chart specifies that the maximum amount allowed for transactions is renewable on the first day of a month. Circles shown in the chart denote the date of implementing the renewal. Actually, as shown in FIG. 5, the renewal process is executed on the initial trading day C after the renewal date is past. Marks A, B, D, F and G shown in FIG. 5 denote those cases in which the maximum amount allowed for transactions is reduced as a result of executing normal transactions. Mark H denotes the effective term of renewal, such as a month, for example. Mark E denotes the case in which the card holder has executed transactions beyond the maximum allowable amount during the term. In this case, CPU 30 causes liquid crystal display 16 to display a message that the transaction is prohibited before eventually terminating the trading process. Mark E' also shows a particular case in which the card issuer has received a certain amount of monetary replenishment from the card holder by more than the maximum renewable amount. Note that any description on the method of collecting monetary replenishment from the card holder is not provided, since it is not a part of this invention.

Mark F shown in FIG. 5 denotes the case in which no renewal process is executed because the maximum amount allowed for transactions is still in excess of the maximum amount provided for the renewal.

The examples cited above cause processes to be executed for renewing the maximum amount allowed for transactions in each effective term by writing the amount of region 46 (n) into region 42 (n) of data memory 32. Alternatively, the renewal process can also be executed by storing the sum of the amount in the region 42 (n) and the amount in the region 46 (n) to constitute a new maximum amount allowed for executed transactions.

In the manner mentioned above, the portable electronic medium executes a renewal process as required when the card holder selects any of those transacting accounts by allowing data memory to preliminarily store the maximum amount allowed for transactions during each effective term, effective term for transactions, maximum amount allowed for renewal, and effective term for the renewal.

The portable electronic medium compares the effective term for transactions stored in the data memory with data related to the present date generated by clock circuit. If the value of data related to the present date were in excess of the value related to the effective term for transactions, the portable electronic medium executes a renewal process.

The maximum amount allowed for transactions in any effective term stored in data memory is converted into the new maximum amount allowed for transactions during the next effective term, and finally, the portable electronic medium rewrites the maximum amount allowed for transactions during the effective term stored in the data memory.

Consequently, it is possible for the portable electronic medium related to the invention to automatically renew the maximum amount allowed for transactions during any effective term on the basis of an optional term inside of the IC card. As a result, the portable electronic medium dispenses with procedure and processes conventionally necessary for renewing the maximum amount allowed for implementing transactions by the card holder, and yet, the portable electronic medium eliminates the needs for communicating with the host computer, thus effectively providing practical convenience of use.

The above preferred embodiment causes the portable electronic medium to first identify whether the maximum amount allowed for transactions during an effective term exceeds the maximum amount designated for renewal, or not, before eventually renewing the maximum amount allowed for transactions during the effective term and the effective term for transactions itself. However, it is not always necessary for this preferred embodiment to identify whether the maximum amount allowed for transaction exceeds the maximum amount designated for the renewal, or not.

Although only a single preferred embodiment of this invention has been described in detail above, those skilled in the art will readily appreciate that many modifications are possible in the preferred embodiment without departure from the novel teachings and advantages of this invention. Accordingly, all such modifications are intended to be included in this invention as defined by the following claims.

What is claimed is:

1. A portable electronic medium, comprising:
    first memory means for storing term data which relates to an effective time of the medium;
    second memory means for storing maximum amount data indicating a monetary amount allowed for executing transactions to the medium within the effective time;
    third memory means for storing renewable data indicating a monetary amount for setting new maximum amount data in the second memory means;
    timer means for generating data relating to time;
    comparison means for comparing the data generated by the timer means with the term data in the first memory means; and
    renewal means for renewing the maximum amount data in the second memory means in accordance with the renewable data in the third memory means when the comparison means indicates that the data generated by the timer means exceeds the term data in the first memory means.

2. A portable electronic medium according to claim 1, wherein the renewal means includes a monetary amount comparing means for comparing the maximum amount data in the second memory means with the renewable data in the third memory means, and the renewal means renews the maximum amount data only when the monetary amount comparing means indicates that the maximum amount data is less than the renewable data.

3. A portable electronic medium according to claim 1, wherein the renewal means stores the renewable data read from the third memory means into the second memory means so that the renewable data indicates newly-provided maximum amount data.

4. A portable electronic medium according to claim 1, wherein the renewal means generates newly-provided maximum amount data by adding the renewable data in the third memory means to the maximum amount data in the second memory means.

5. A portable electronic medium according to claim 1, wherein the second memory means stores a plurality of maximum amount data each for one of a plurality of accounts, and the third memory means stores a plurality of renewable data each corresponding to one of the maximum amount data, respectively.

6. A portable electronic medium according to claim 1, further comprising:
    input means for entering monetary amount data indicating transaction data associated with the medium; and
    subtracting means for subtracting the monetary amount data entered by the input means from the maximum amount data in the second memory means.

7. A portable electronic medium according to claim 1, wherein:
    said first memory means stores term data relating to an effective date;
    said timer means includes calendar means for generating data relating a present date; and said comparison means compares said effective date with said present date.

8. A portable electronic medium according to claim 1, further comprising:
fourth memory means for storing renewable term data which relates to a next effective time;
another renewal means for renewing the term data in the first memory means in accordance with the renewable term data in the fourth memory means when the comparison means indicates that the data generated by the timer means exceeds the term data in the first memory means.

9. A portable electronic medium according to claim 8, wherein:
said first memory means stores term data relating to an effective date;
said timer means includes calendar means for generating data representing a present date; and
said comparison means compares said effective date with said present date.

10. A portable electronic medium according to claim 9, wherein the fourth memory means includes the number of days in a term as the renewable term data, and another renewal means generates newly-provided term data by adding the number of days to the term data in the first memory means.

11. A portable electronic medium according to claim 8, wherein the first memory means stores a plurality of term data, each for one of a plurality of accounts, and the fourth memory means stores a plurality of renewable term data each corresponding to one of the term data, respectively.

* * * * *